United States Patent
Kidger et al.

(10) Patent No.: US 8,982,523 B2
(45) Date of Patent: Mar. 17, 2015

(54) BIAS VOLTAGE CIRCUIT FOR BIASING A TRANSIENT SUPPRESSION DEVICE AND APPARATUS USING SAME

(75) Inventors: Alexander C. Kidger, Devon (GB); Nigel J. R. King, Devon (GB); Timothy G. Wild, Devon (GB)

(73) Assignee: Cambium Networks, Ltd, Devon (GB)

( * ) Notice: Subject to any disclaimer, the term of this patent is extended or adjusted under 35 U.S.C. 154(b) by 986 days.

(21) Appl. No.: 13/034,934

(22) Filed: Feb. 25, 2011

(65) Prior Publication Data
US 2012/0218668 A1   Aug. 30, 2012

(51) Int. Cl.
*H02H 3/22*   (2006.01)
*H04B 3/00*   (2006.01)

(52) U.S. Cl.
CPC ....................................... *H04B 3/00* (2013.01)
USPC ........................................................ 361/111

(58) Field of Classification Search
USPC ..................................................... 361/18, 111
See application file for complete search history.

(56) References Cited

U.S. PATENT DOCUMENTS

| | | | |
|---|---|---|---|
| 4,539,490 A * | 9/1985 | Ariizumi et al. | 327/536 |
| 6,243,268 B1 * | 6/2001 | Kang et al. | 361/715 |
| 6,396,724 B1 * | 5/2002 | Hirst | 363/125 |
| 2007/0086129 A1 * | 4/2007 | Vos et al. | 361/56 |
| 2007/0236853 A1 * | 10/2007 | Crawley | 361/119 |
| 2008/0094766 A1 * | 4/2008 | Casey | 361/56 |

* cited by examiner

*Primary Examiner* — Thienvu Tran
*Assistant Examiner* — Ann Hoang
(74) *Attorney, Agent, or Firm* — Brinks Gilson & Lione

(57) ABSTRACT

Embodiments provide a charge pump circuit which produces a bias voltage that is applied to a transient suppression device used to clamp both positive and negative transients on signal lines. The bias voltage can be set to a level that is above the sum of a DC voltage differential between positive and negative signal lines and the maximum signal voltage.

5 Claims, 4 Drawing Sheets

BIAS VOLTAGE CIRCUIT FOR BIASING A TRANSIENT SUPPRESSION DEVICE AND APPARATUS USING SAME

FIELD OF THE INVENTION

The invention relates generally to the suppression of otherwise harmful electrical transients in electrical circuits, and more particularly to transient protection on signal lines that may be exposed to, or are otherwise at risk of, harmful electrical transients.

BACKGROUND

Transient suppression refers to protecting circuits and circuitry from excessive electrical conditions, such as voltage excursions introduced from natural and artificial sources that can damage circuit elements and components. In a typical protection scheme, special circuit elements are added to handle transient events. It is desired that transient suppression circuit elements have no substantial effect on the operation of the protected circuit elements under normal operating conditions, and only act when an electrical transient occurs, such as a voltage level excursion beyond normal operating parameters. However, in some situations, the transient handling components can lead to degraded performance of the circuits they protect. Transient suppression circuit elements typically have some parasitic effect which is generally proportional to the magnitude of transient intended to be suppressed. In designing a transient protection scheme the designer may have to balance the parasitic effects against the magnitude of the transients that can be effectively suppressed.

One application in particular where transient suppression components can affect the operation of an electrical system is in signal lines that may be exposed to highly energetic transients. One example of such a system would be a network line deployed outdoors, and therefore at risk of transients which couple into signal lines and other components from a lightning strike to a nearby object or structure. In order to handle energetic events of such magnitude, the transient suppression components themselves tend to be physically large. As a result, these components can introduce undesired capacitance and leakage current drain on signal lines, which can degrade signal performance. Therefore there is a need for a means by which such undesired aspects are substantially avoided.

SUMMARY

In at least one embodiment there is a circuit for biasing a signal line transient suppression device that has a clamp voltage level at which it clamps voltage on at least a first signal line and a second signal line. The first and second signal lines provide a power voltage differential between them. The circuit includes an input network having a first input operable to be coupled to the first signal line and a second input operable to be coupled to the second signal line. The input network produces a direct current (DC) voltage between a positive input line and a negative input line from the power voltage differential regardless of the polarity of the power voltage differential between the first signal line and the second signal line. The circuit can further include a bias voltage generator that has a positive input connected to the positive line of the input network and a negative input connected to the negative line of the input network. The bias voltage generator circuit is operable to produce a DC voltage output between a positive output and a negative output. The positive output is coupled to a positive side of the transient suppression device, and the negative output is coupled to a negative side of the transient suppression device. The DC output voltage is provided at a level that is above the sum of a maximum amplitude of the power voltage differential between the first and second signal lines and a signal level between the first and second signal lines.

Other embodiments provide a transient suppression unit that has a first connector and a second connector with a plurality of signal lines connecting the first and second connectors, for example, via a signal line bus. A plurality of positive polarity transient steering diodes, each having an anode and a cathode, are coupled to the signal lines. The anode of each positive polarity transient steering diode is connected to one of the plurality of signal lines where there is one positive polarity transient steering diode for each one of the plurality of signal lines. There is further included a plurality of negative polarity transient steering diodes, each having an anode and a cathode, with the cathode of each negative polarity transient steering diode connected to one of the plurality of signal lines, where there is one negative polarity transient steering diode for each one of the plurality of signal lines. The transient protection unit also includes a transient suppression circuit that has a positive side coupled to the cathode of each of the plurality of positive polarity transient steering diodes and a negative side coupled to each of the anodes of the plurality of negative polarity transient steering diodes. The transient suppression circuit has a clamp voltage at which the transient suppression circuit clamps the voltage on each of the plurality of signal lines relative to a ground reference. A bias circuit provides a bias voltage across the transient suppression circuit that is at least sufficiently high enough to reverse bias each of the plurality of positive polarity transient steering diodes and each of the plurality of negative polarity transient steering diodes.

Other embodiments include a transient protected electrical apparatus that comprises a network connector configured to receive a powered network bus that has a plurality of signal lines including at least one positive signal line and at least one negative signal line with a power voltage differential between the positive and negative signal lines. The apparatus includes a transient protection unit coupled to the plurality of signal lines and operable to be powered by the power voltage differential, and having a positive polarity transient steering diode and a negative polarity transient steering diode coupled to each signal line, wherein the positive polarity transient steering diodes are coupled to the negative polarity transient steering diodes through a transient suppression circuit that is biased by a bias circuit of the transient protection unit with a direct current (DC) voltage that is at a bias voltage level that is higher than a sum of the voltage differential between the positive and negative signal lines and a maximum signal level. The apparatus further includes a protected circuit coupled to the network bus.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Embodiments of the invention address the problems associated with prior transient suppression solutions by generating a direct current (DC) bias voltage to bias the transient suppression device at a voltage level that is above the sum of the highest voltage level expected on the signal line or lines that are protected by the transient suppression device. As used here, the term "transient" refers to any undesirable electrical event introduced into the system from an external source that exceeds ordinary levels at which the system normally operates. Since the bias voltage is applied across the transient suppression device, it obviously cannot exceed the clamp voltage. In some applications the bias voltage can be lower than the clamp voltage, and in others the bias voltage can be substantially equal to the clamp voltage. Steering diodes, used for directing excessive voltage transients of either positive or negative polarity, prevent the bias voltage from affecting the signal lines. By biasing the transient suppression device, the steering diodes normally connected to the transient suppression device become reverse biased, and signal voltage transitions on the signal lines are substantially less affected by the parasitic capacitance of the transient suppression device and components compared to when the bias voltage is not applied to the transient suppression device. By reverse biasing the steering diodes, the capacitance of the steering diodes are reduced, further enhancing signal line properties for signal transmission.

Figure 1:
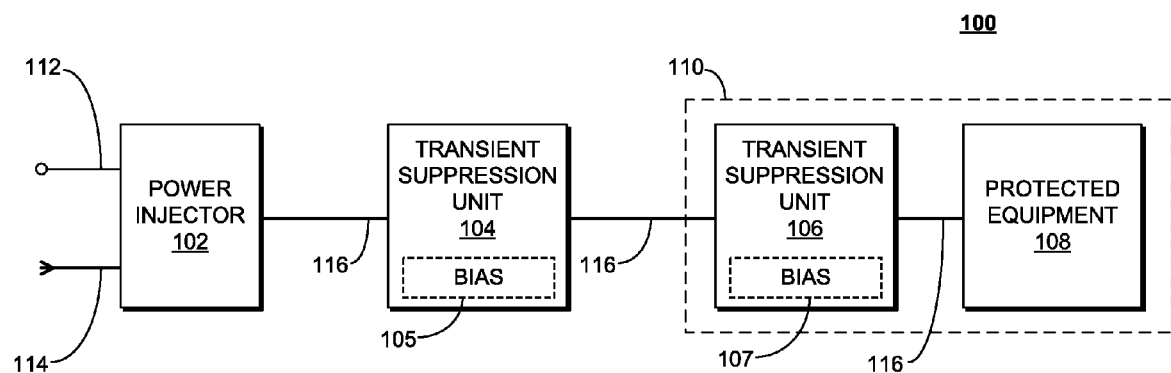
FIG. 1 shows a system block diagram of a signal transmission system utilizing actively biased transient suppression, in accordance with an embodiment.

FIG. 1 shows a system block diagram of a signal transmission system 100 utilizing actively biased transient suppression, in accordance with an embodiment. Generally, the present example is representative of embodiments that provide power over signal lines, although those skilled in the art will realize that the inventive principles described herein can be applied to any system where signal transmission may be affected by the parasitic characteristics of transient suppression devices used to protect signal lines. A signal line is an electrical conductor which is used to convey an electrical signal, or a reference conductor, such as a ground, that provides a basis for establishing a signal amplitude on other related signal lines. Signals are produced by controlling the electrical levels on the signal line, and can convey information, control levels, or both, and they can be analog, digital, or both. A signal can therefore be as simple as an "on/off" change, or it can be a very complex modulated multi-carrier, multi-frequency radio signal, among other examples. In some systems multiple signals can be carried on a single signal line. In some embodiments the signal line is also used to convey electrical power. The power can be used by terminal equipment and intermediate equipment such as, for example, cascade amplifiers, as well as transient protection units in accordance with embodiments of the inventive principles taught herein. The power can be provided in the form of a voltage differential between two or more signal lines. In some embodiments the power can be DC, and in others it can be alternating current (AC). Providing power over signal lines is presently done in a variety of settings, such as, for example, power over Ethernet (PoE). PoE has, in fact, become widely used and has been standardized in industry-accepted standards, such as the Institute of Electronic and Electrical Engineers (IEEE) standard 802.3 at, which allows up to 25.5 Watts of power to be provided over Ethernet signal lines. Some manufacturers have developed proprietary PoE systems based on the standard that provide substantially higher power levels, or provide power on more or fewer signal lines, or both.

Power is provided to the signal lines by a power injector 102. A power injector 102 provides a DC voltage differential between signal lines and sources enough current to sustain the voltage up to a selected power level. The power by the power injector can be used by equipment connected to the signal lines to power the circuitry of the equipment. Electrical power is provided to the power injector 102 at a power input 112 and combined with signals provided to the power injector 102 at a signal input 114 to produce a powered signal line 116 output. The powered signal line 116 transmits signals and power to other equipment attached to the powered signal line 116, including, for example, terminal equipment 110. The terminal equipment includes protected equipment 108, that can be, for example, a radio access point. The terminal equipment 110 can further include a transient suppression unit 106 that protects the protected equipment or circuit 108 from electrical transients coming into the terminal equipment 110. An additional transient suppression unit 104 can be placed along the powered signal line 116 between the power injector 102 and the terminal equipment 110 to attenuate electrical transients introduced into the powered signal line 116 at other locations along the powered signal line 116. Each of the transient suppression units 104, 106 include a transient suppression circuit that clamps or limits the voltage on each of the signal lines connected to the transient suppression circuit. The transient suppression circuit contains a transient suppression device or component that generally does not conduct current until a clamp voltage level is reached. The term "clamp voltage" refers to a voltage at which the clamp device, such as the transient suppression device transitions from an essentially non-conducting state to a conducting state where the device conducts in a highly non-linear way that is similar to a diode effect, and in fact Zener diodes can be used as clamp devices. The transient suppression device is selected to have a clamp voltage level to be at a level sufficiently low to protect circuitry connected to the signal lines, but high enough to not affect signal performance, meaning the clamp voltage is higher than the sum of the DC power voltage and the maximum expected signal amplitude. The transient suppression device can be a semiconductor component such as, for example, a zener diode or opposite-facing zener diode pair, or any equivalent voltage clamping component. The transient suppression units can each further include an active bias circuit 105, 107, respectively. The active bias circuits 105, 107 generate a DC voltage that is higher than the sum of the DC power voltage level on the signal lines and the maximum expected signal level. The bias voltage produced by the bias circuits 105, 107 is applied across the transient suppression device.

Figure 2:
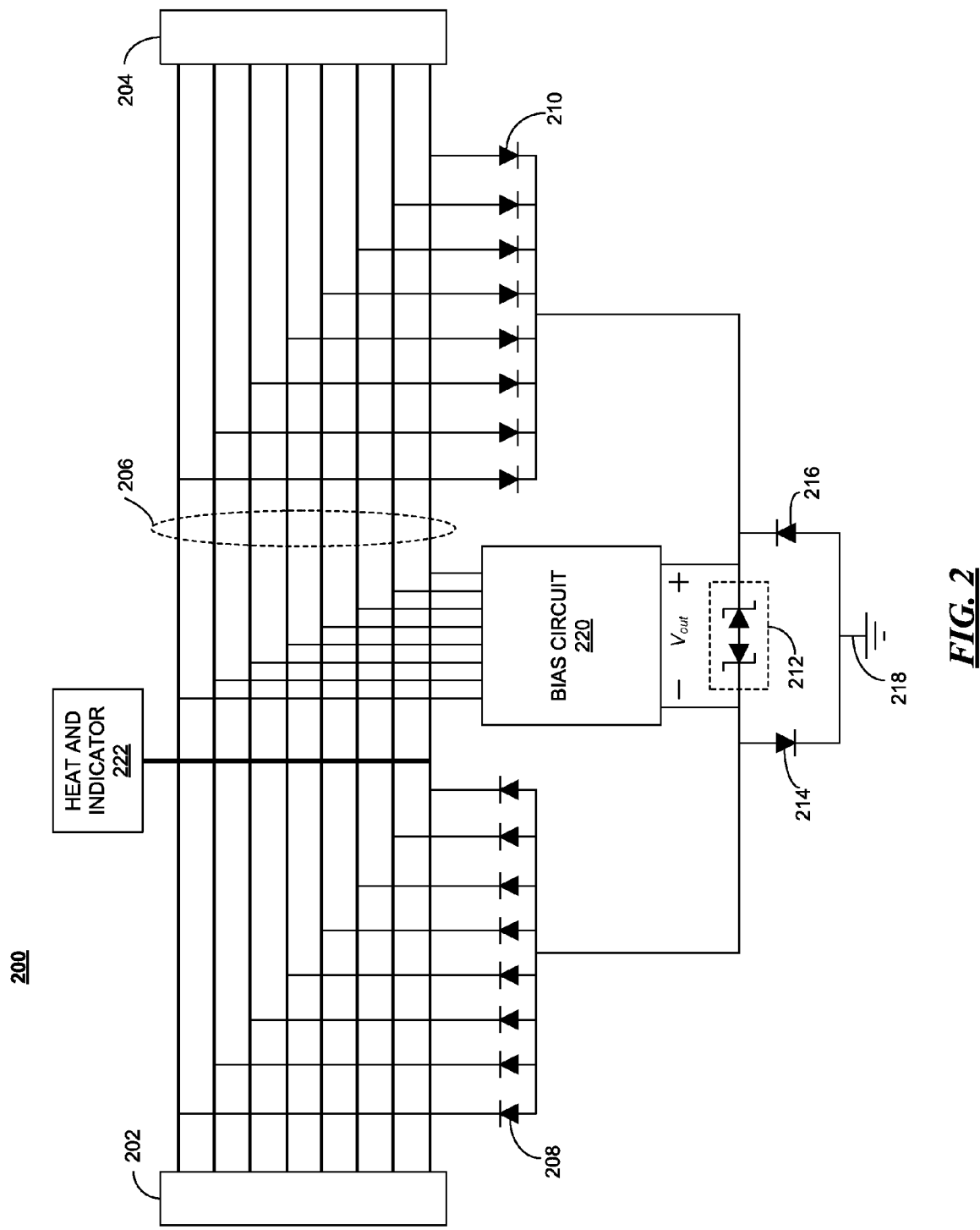
FIG. 2 shows a schematic diagram of a circuit utilizing actively biased transient suppression, in accordance with an embodiment.

FIG. 2 shows a schematic diagram of a circuit 200 for a transient protection unit utilizing actively biased transient suppression, in accordance with an embodiment. The circuit 200 represents an example of a transient suppression unit, such as units 104, 106 of FIG. 1. Signal lines 206 can be coupled between a first connector 202 and a second connector 204. The group of signal lines 206 can be referred to as a signal line bus. The first and second connectors can be, for example 8 pin or 8 line connectors such as RJ45 type network connectors for an Ethernet network connection. Accordingly, signal lines 206 can include eight signal lines, as is common in Ethernet networks such as PoE arrangements in compliance with IEEE 802.3 specifications. The connectors allow the transient suppression unit to be coupled in series along a signal line, as well as at the termination of the signal line, for example, inside a protective enclosure and electrically between the physical point where the signal line bus enters the enclosure and a protected circuit, thereby providing transient protection to the protected circuit or equipment. A negative polarity transient steering diode 208 and a positive polarity transient steering diode 210 can be connected to each signal line. Each negative polarity transient steering diode 208 has its cathode connected to its respective signal line, and its anode connected to the negative side of a transient suppression device 212. Each positive polarity transient steering diode 210 has its anode connected to its respective signal line, and its cathode connected to the positive side of the transient suppression device 212. Upon the occurrence of an overvoltage transient on any of the signal lines, the voltage on the signal line will rise relative to an earth ground 218. When the voltage on the signal line reaches a voltage level equal to the sum of forward voltage of the positive polarity transient steering diode 210, the clamp voltage of the transient suppression device 212, and forward voltage of positive grounding diode 214, current will flow into the earth ground and the voltage on the signal line will be clamped. Likewise, when a negative transient occurs on a signal line, the voltage on the signal line will drop relative to the earth ground 218, and when the voltage reaches the sum of the forward voltage of the negative polarity transient steering diode 208, the clamp voltage of the transient suppression device 212, and the forward voltage of a negative grounding diode 216, current will flow from the earth ground to the signal line on which the negative transient has occurred, clamping the voltage on the signal line.

The use of negative polarity transient steering diodes 208 and positive polarity transient steering diodes 210, in conjunction with the transient suppression device 212 and positive and negative grounding diodes 214, 216 is known. The junction capacitance and leakage current associated with these components tends to affect signal performance because signal transitions are affected by this capacitance, which limits the speed at which transitions can occur reliably.

To prevent the issues associated with the parasitic capacitance associated with the transient suppression circuitry, a bias voltage generator circuit 220 is used to generate a DC bias voltage $V_{out}$ across the transient suppression device 212. The DC bias voltage is generated to be at a level that is above the maximum signal line voltage, which is the sum of the DC power voltage differential and signal voltage. Accordingly, the positive polarity transient steering diodes 210 and negative polarity transient steering diodes 208 will be reversed biased, substantially eliminating the effect of the junction capacitance of the transient suppression device 212 on the signal lines. The bias voltage generator circuit 220 can be connected to the signal lines 206 and draw power from the signal lines to generate the bias voltage. However it is contemplated that in some embodiments the bias voltage generator circuit 220 can be powered from a separate source, including a separate DC voltage source, an alternating current (AC) source, or an electrochemical cell battery.

Furthermore, it is contemplated that a heating unit 222 can be advantageously incorporated into the transient suppression unit 200. The heating unit 222 utilizes power provided on the signal lines 206 to generate heat through resistive dissipation. By heating the unit, even mildly, condensation which may otherwise result from changing climate can be reduced if not substantially eliminated. Additionally, a power indicator can be included in the heating unit 222 to provide a visual indication that power is present on the signal lines.

Figure 3:
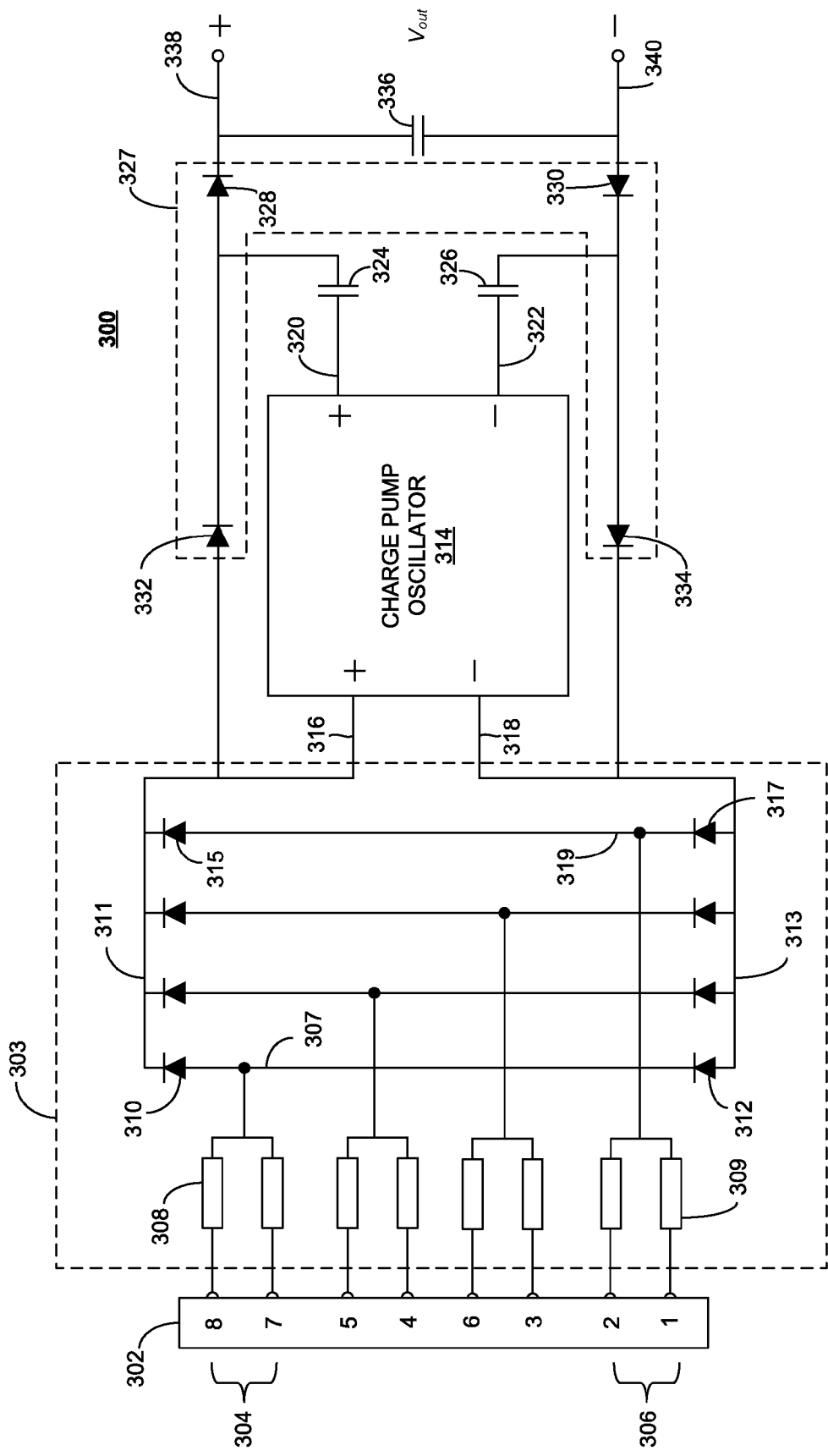
FIG. 3 shows a schematic diagram of a biasing circuit for use in actively biasing a transient suppression device, in accordance with an embodiment.

FIG. 3 shows a schematic diagram of a biasing circuit 300 for using in actively biasing a transient suppression device, in accordance with an embodiment. The biasing circuit 300 can be substantially the same as bias voltage generator circuit 220 of FIG. 2. In the present embodiment, the bias circuit 300 is powered from the signal lines 302. Signal lines generally can be powered to provide power to equipment connected to the signal lines to avoid having to run additional power lines. One example of powered signal lines can be found in specifications described by the IEEE 802.3 group of specifications regarding Ethernet, including, for example, IEEE 802.3 at. The embodiments of the invention can be applied to any powered signal line arrangement, as well as unpowered signal lines.

In the present example a first subset of lines 304 carry a power voltage at a first polarity and a second subset of lines 306 carry the power voltage at the opposite polarity. If the power voltage is provided as a direct current (DC) voltage, then, for example, lines 304 can be positive and lines 306 can be negative. The power voltage can also be provided as alternating current (AC) in some embodiments. There is a power voltage differential between the lines 304 and the lines 306. In some embodiments the power voltage differential can be DC and be substantially fifty five volts, although the inventive principles apply as well to systems using more or less than 55 volts. The bias circuit has an input network 303 which produces a DC output between a positive line 311 and a negative line 313. Generally the input network allows bias circuit 300 to operate regardless of the polarity of power voltage provided on the signal lines, or whether the power voltage is provided as DC or AC. A first input is operable to be coupled to a first signal line, which in the present example can be either signal line 8 or signal line 7, or both if they have a common polarity, as in the present example. The first signal line can be coupled through a first input impedance 308 to the center point 307 of a first pair of series connected diodes 310, 312. These diodes operate as rectifying diodes, allowing either polarity of power voltage, as well as an AC power voltage to be used. The cathode of diode 310 is connected to the positive line 311, the anode of diode 310 is connected to the cathode of diode 312, and anode of diode 312 is connected to the negative line 313. In some embodiments signal line pairs such as lines 7 and 8 can have a common power voltage polarity, and thus can be paired together, each through their own respective impedance, as shown, the a common diode pair 310, 312. Alternatively, line 7, which can be a third input, can be connected to another diode pair (not shown). A second input is operable to be coupled to a second signal line, such either of lines 1 or 2, which has an opposite power voltage polarity from that of lines 7 and 8. Similarly, a second input impedance 309 is coupled between the input connected to the second signal and the center point 319 of a second pair of diodes 315, 317 connected in series between the positive line 311 and the negative line 313, oriented the same as the first diode pair 310, 312. Additional lines may be configured similarly, as shown. In the present example, lines 1 and 2 have a common power voltage polarity. Line 2 can be a fourth input and can be commonly paired with line 1 through a respective input impedance to the same diode pair 315, 317 as line 1. Other lines can be configured similarly. In the example of FIG. 3, pairs of lines 1 and 2, 3 and 6, 4 and 5, and 7 and 8 have common power voltage polarities (or no power voltage). Those skilled in the art will recognize that only two of the signal lines are required to provide the power voltage differential, and furthermore, that if each signal line in a given embodiment is coupled through a diode pair, the particular signal lines that carry the power voltage differential is irrelevant as the output of the input network 303 will always be a DC voltage between the positive line 311 and the negative line 313.

More or fewer lines can be powered without departing from the scope and spirit of the inventive teachings herein. The number of input impedances 308, 309 and diode pairs 310, 312 and 315, 317 can be adjusted accordingly, although in at least one embodiment it is contemplated that all 8 lines can be configured substantially as shown in FIG. 3 to accommodate any variations in powering arrangements on the signal lines. In other embodiments, the circuit can be configured to connect to only a single positive signal line and a single negative signal line. The input impedances 308, 309 can be resistive, inductive, or both, and can be selected to have an impedance magnitude higher than the magnitude of the characteristic impedance of the signal lines to substantially decouple the bias circuit from the signal lines at signal frequencies. Furthermore, the example shown in FIG. 3 works when the polarity of the power voltage is unknown, or when it is provided in AC form on the signal lines, and as such, is designed to operate regardless of the polarity of the power voltage by virtue of the rectifying diodes. If the circuit is designed to operate with a known DC polarity, those skilled in the art will recognize that rectifying input diodes are not necessary, although they may still be desirable in particular applications.

A voltage generator is used to generate the bias voltage. One example of a voltage generator is a charge pump circuit. A charge pump circuit uses an input voltage at one level to generate a higher voltage by switching charge accumulators, such as capacitors, from parallel to series configurations, and back. The capacitors are charged when switched in parallel, and, when switched in series, discharged through the output. The switching in a charge pump circuit can be performed using an oscillator such as charge pump oscillator 314. The charge pump oscillator 314 has a positive input 316 connected to the positive line 311, and a negative input 318 coupled to the negative line 313. The charge pump oscillator 314 is operable to be powered by the DC voltage differential between the positive line 311 and negative line 313 which is derived from the power voltage differential provided on the signal lines. The charge pump oscillator produces a DC voltage output between the positive output 338 and a negative output 340. The positive output 338 is coupled to the positive side of the transient suppression device 212 (not shown in FIG. 3), while the negative output 340 is coupled to a negative side of the transient suppression device 212. The DC output voltage $V_{out}$ can be at a level that is above the sum of the power voltage differential on the signal lines, and the maximum signal level to ensure that the steering diodes 208, 210 are always reverse biased.

In at least one embodiment the charge pump oscillator 314 provides an output between a positive output 320 and a negative output 322. A rectifier circuit 327 that is capacitively coupled to the positive 320 and negative 322 outputs rectifies the output of the oscillator 314 to provide the DC output voltage. The rectifier circuit 327 includes a positive rectifier 328 and a negative rectifier 330. The rectifier circuit 327 can further include a positive bridging rectifier 332 coupled between the positive rectifier 328 and the positive input diode 310, and a negative bridging diode 334 coupled between the negative rectifier 330 and the negative input diode 312. The positive output 320 of the oscillator 314 is coupled to the junction of the positive rectifier 328 and the positive bridging rectifier 332 through a positive output capacitance 324, and the negative output 322 of the oscillator 314 is coupled to the junction of the negative rectifier 330 and the negative bridging rectifier 334 through a negative output capacitance 326. An output filter capacitance 336 can be coupled across an output of the rectifier circuit and is configured to be in parallel with the transient suppression device when the output filter capacitance 336 is present. The charge pump oscillator 314 switches output capacitors 324, 326 between a parallel configuration and a series configuration. When connected in parallel, capacitors 324 and 326 are charged through diodes 332, 334, respectively. When connected in series, charge in the capacitors 324, 326 is conducted through diodes 328, 330, and results in a DC voltage that is higher than the DC voltage differential provided on the signal lines.

By coupling to each of the powered signal lines, the power drawn by the charge pump circuit is balanced among the signal lines. Each signal line has a characteristic impedance, and the input impedances 308, 309 are selected to have an impedance value that is sufficiently higher than the magnitude of the signal line characteristic impedance to reduce parasitic effects of the transient protection circuitry from interfering with signal transmission performance. In some applications the input impedances can have an impedance that is of the order of approximately ten times higher than the magnitude of the characteristic impedance of the signal lines, although a smaller factor can be used, depending on the application. For example, the signal lines in one embodiment using CAT5e Ethernet wiring can have a characteristic impedance of about 100 ohms, and the input impedances can be selected to be about 3600 ohms.

Figure 4:
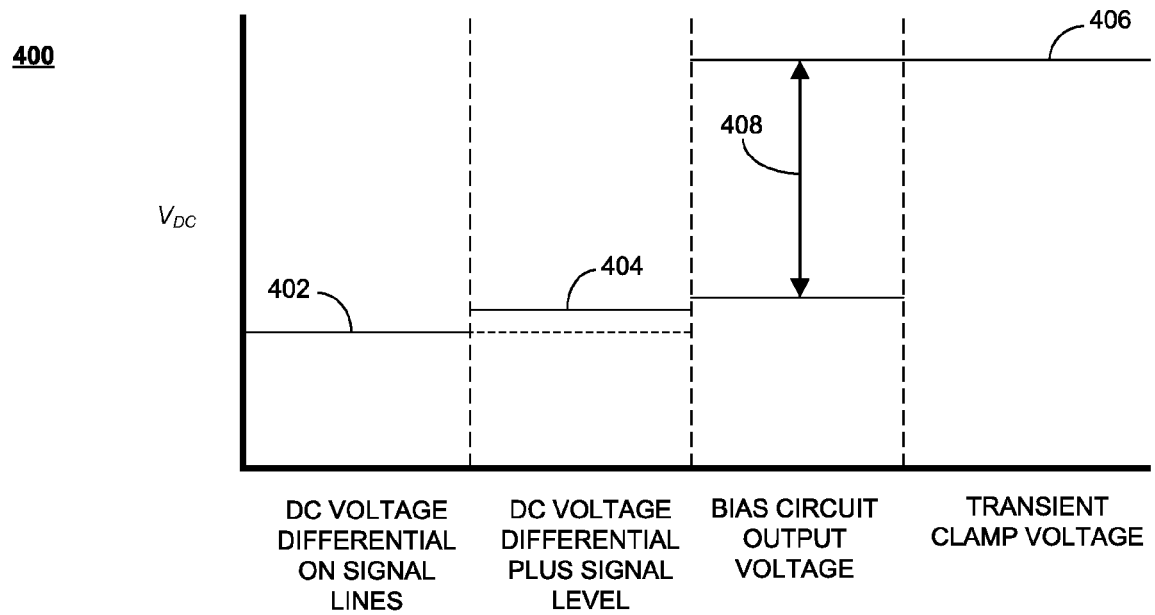
FIG. 4 shows a graph chart diagram showing various voltage levels in a system utilizing actively biased transient suppression, in accordance with an embodiment.

FIG. 4 shows a graph chart diagram 400 showing various voltage levels in a system utilizing actively biased transient suppression, in accordance with an embodiment. The DC voltage differential between positive signal lines and negative signal lines is at a first level 402. Signals transmitted over the signal lines add to the DC voltage differential resulting in a sum 404 at a second level. The transient clamp voltage 406 is substantially higher than the sum 404. The bias circuit output voltage applied across the transient suppression device is set to a level in the range 408 that is above the sum 404 and less than or equal to the clamp voltage 406 of the transient suppression device.

Figure 5:
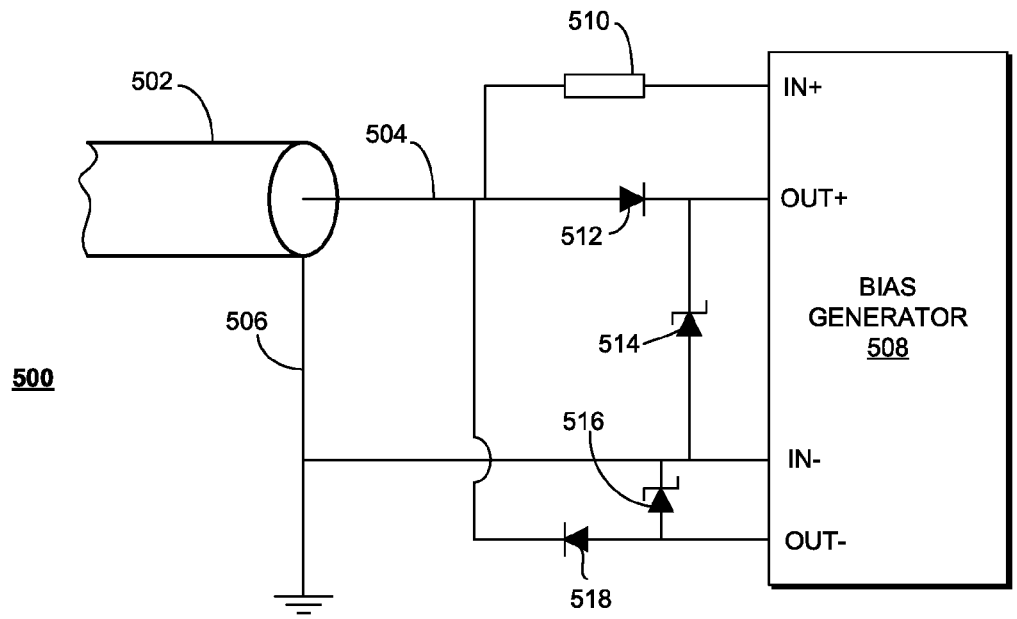
FIG. 5 shows a schematic diagram of an embodiment using powered coaxial cable, in accordance with an embodiment.

FIG. 5 shows a schematic diagram 500 of an embodiment using powered coaxial cable, in accordance with an embodiment. A coaxial (coax) cable 502 contains a center conductor 504 and shielding conductor 506. The center conductor 504 can be a signal line that carries signals. Furthermore, the center conductor 504 can carry a power voltage. In some embodiments, such as cable television signal distribution, for example, a square wave AC power voltage is used to power equipment such as cascade amplifiers and the like. Such cable is commonly hung on poles outdoors and is susceptible to transients resulting from nearby lightning strikes. A bias voltage generator 508 has a positive input "IN+," and negative input "IN−," a positive output "OUT+" and a negative output "OUT−." Power is provided to the bias voltage generator 508 though a similar input network as that shown in FIG. 3, 303, and can include, for example, an input impedance 510. The input network provides a positive DC voltage to the bias voltage generator 508 between the positive and negative inputs. The bias voltage generator 508 provides a DC output between the positive and negative outputs, which is provided across a transient suppression circuit, shown here comprised of zener diodes 514, 516. Steering diodes 512, 518 function substantially the same as the steering diodes shown in FIG. 2. The example shown in FIG. 5 works when the polarity of the power voltage is unknown, and as such, is designed to operate regardless of the polarity of the power voltage. If the circuit is designed to operate with a known DC polarity, those skilled in the art will recognize that rectifying input diodes are not necessary, although they may still be desirable in particular applications.

This invention can be embodied in other forms without departing from the spirit or essential attributes thereof. Numerous modifications and equivalent circuits will occur to those skilled in the art upon reading and understanding the teachings herein. Accordingly, reference should be made to the following claims, rather than to the foregoing specification, as indicating the scope of the invention.

What is claimed is:

1. A circuit for biasing a signal line transient suppression device, the transient suppression device having a clamp voltage level at which it clamps voltage on at least a first signal line and a second signal line, a power voltage differential being provided between the first signal line and the second signal line, the circuit comprising:
   an input network having a first input operable to be coupled to the first signal line and a second input operable to be coupled to the second signal line, the input network produces a direct current (DC) voltage between a positive input line and a negative input line from the power voltage differential between the first signal line and the second signal line; and
   a bias voltage generator having a positive input connected to the positive input line of the input network and a negative input connected to the negative input line of the input network, the bias voltage generator circuit operable to produce a DC voltage output between a positive output and a negative output, the positive output coupled to a positive side of the transient suppression device, the negative output coupled to a negative side of the transient suppression device, the DC output voltage is at a level above the sum of a maximum amplitude of the power voltage differential between the first and second signal lines and a signal level between the first and second signal lines, wherein the input network comprises:
   a first input impedance coupled between the first input and a center point between a first diode pair coupled in series between the positive line and the negative line of the input network; and
   a second input impedance coupled between the second input and a center point between a second diode pair coupled in series between the positive line and the negative line of the input network.

2. The circuit of claim 1, wherein the bias voltage generator circuit comprises a charge pump circuit.

3. The circuit of claim 2, wherein the charge pump circuit comprises:
   an oscillator that provides an output between a positive output and a negative output;
   a rectifier circuit capacitively coupled to the positive and negative outputs of the oscillator and that rectifies the output of the oscillator to provide the DC output voltage; and
   an output filter capacitance coupled across an output of the rectifier circuit and configured to be in parallel with the transient suppression device.

4. The circuit of claim 1, further comprising:
   a third input operable to be coupled to a third signal line having a power voltage polarity in common with the first signal line, a third input impedance coupled between the third input and the center point of the first diode pair; and
   a fourth input operable to be coupled to a fourth signal line having a power voltage polarity in common with the second signal line, a fourth input impedance coupled between the fourth input and the center point of the second diode pair.

5. The circuit of claim 4, wherein the first input and the second input are operable to be connected to an Ethernet bus operated in accordance with an IEEE 802.3 specification.

\* \* \* \* \*